(12) United States Patent
Pal et al.

(10) Patent No.: US 9,856,389 B2
(45) Date of Patent: Jan. 2, 2018

(54) PRINT MEDIUM INCLUDING TREATMENT LAYER

(71) Applicant: HEWLETT-PACKARD DEVELOPMENT COMPANY, L.P., Houston, TX (US)

(72) Inventors: Lokendra Pal, San Diego, CA (US); Xulong Fu, San Diego, CA (US); Ronald J Selensky, San Diego, CA (US); Xiaoqi Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/652,184

(22) PCT Filed: Dec. 20, 2012

(86) PCT No.: PCT/US2012/071078
§ 371 (c)(1),
(2) Date: Jun. 15, 2015

(87) PCT Pub. No.: WO2014/098878
PCT Pub. Date: Jun. 26, 2014

(65) Prior Publication Data
US 2015/0329732 A1    Nov. 19, 2015

(51) Int. Cl.
*B41M 5/00* (2006.01)
*C09D 101/02* (2006.01)
(Continued)

(52) U.S. Cl.
CPC ............. *C09D 101/02* (2013.01); *B41M 5/50* (2013.01); *B41M 5/52* (2013.01); *B41M 5/5227* (2013.01);
(Continued)

(58) Field of Classification Search
CPC ............. B41M 5/5218; B41M 5/5227; B41M 5/5245
See application file for complete search history.

(56) References Cited

U.S. PATENT DOCUMENTS 4,554,181 A * 11/1985 Cousin ..................... B41M 5/52
346/96
5,731,080 A   3/1998 Cousin et al.
(Continued)

FOREIGN PATENT DOCUMENTS

EP    1472096    11/2004
JP    H0920067   1/1997
(Continued)

OTHER PUBLICATIONS

Extended European Search Report dated Jun. 21, 2016 for Application No. PCT/US2012071078, Applicant Hewlett-Packard Development Company, L.P.

*Primary Examiner* — Betelhem Shewareged
(74) *Attorney, Agent, or Firm* — HP Inc. Patent Department

(57) ABSTRACT

Embodiments provide treated print media, treatment compositions, and methods for forming treated print media. In some embodiments, a treated print medium may include a substrate and a treatment layer on the substrate, the treatment layer including microfibrils and an ink-fixing agent. Other embodiments are described and claimed.

15 Claims, 5 Drawing Sheets

(51) Int. Cl.
  *B41M 5/52* (2006.01)
  *B41M 5/50* (2006.01)
(52) U.S. Cl.
  CPC ......... *B41M 5/0017* (2013.01); *B41M 5/5218* (2013.01); *B41M 5/5236* (2013.01); *B41M 5/5245* (2013.01)

(56) References Cited

U.S. PATENT DOCUMENTS

| | | | | |
|---|---|---|---|---|
| 5,963,419 | A * | 10/1999 | Tanaka | H01G 9/02 361/512 |
| 6,068,939 | A | 5/2000 | Maeda et al. | |
| 6,096,469 | A * | 8/2000 | Anderson | B41M 5/52 423/335 |
| 6,326,323 | B1 * | 12/2001 | Shimano | D06N 3/0056 428/32.16 |
| 6,478,939 | B1 | 11/2002 | Lennox et al. | |
| 6,753,080 | B1 | 6/2004 | Sebastian et al. | |
| 2003/0031839 | A1 * | 2/2003 | Kohno | B41M 5/52 428/195.1 |
| 2004/0213928 | A1 | 10/2004 | Sebastian et al. | |
| 2005/0123696 | A1 | 6/2005 | Campbell et al. | |
| 2009/0297738 | A1 * | 12/2009 | Song | B41M 5/52 428/32.3 |
| 2010/0260939 | A1 | 10/2010 | Foley | |
| 2011/0059272 | A1 | 3/2011 | Tran et al. | |
| 2011/0102497 | A1 | 5/2011 | Sato et al. | |

FOREIGN PATENT DOCUMENTS

| | | |
|---|---|---|
| JP | 2002166646 | 6/2002 |
| JP | 2002264472 A | 9/2002 |
| JP | 2008238772 A | 10/2008 |
| KR | 10-2003-0028917 A | 4/2003 |
| WO | 03064166 | 8/2003 |
| WO | 2010147468 | 12/2010 |

* cited by examiner

PRINT MEDIUM INCLUDING TREATMENT LAYER

BACKGROUND

Inkjet printing continues to gain in popularity. Inkjet printing typically involves dispensing ink droplets onto a surface of a print medium as the print medium is conveyed past a print head of en inkjet printer. Colorant in the ink droplets contacts the surface of the print medium and binds to it. In some instances, the qualities of the particular print medium used may impact print durability and quality.

BRIEF DESCRIPTION OF THE DRAWINGS

Embodiments of the present disclosure will be described by way of example embodiments, but not limitations, illustrated in the accompanying drawings in which like references denote similar elements, and in which.

DETAILED DESCRIPTION OF EMBODIMENTS

Figure 1:
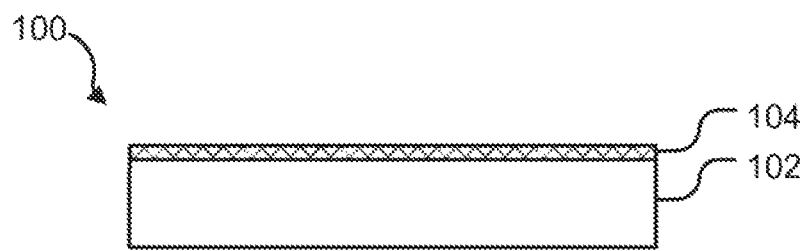
FIG. 1 is a cross-sectional diagram of an example print medium, in accordance with various embodiments.

Embodiments of the present disclosure provide treated print media, treatment compositions, and methods for forming treated print media.

In the following description, various aspects of the illustrative embodiments are described using terms commonly employed by those skilled in the art to convey the substance of their work to others skilled in the art. It will be apparent to those skilled in the art that alternate embodiments may be practiced with only some of the described aspects. For purposes of explanation, specific numbers, materials, and configurations are set forth in order to provide a thorough understanding of the illustrative embodiments. It will be apparent to one skilled in the art that alternate embodiments may be practiced without the specific details. In other instances, well-known features are omitted or simplified in order not to obscure the illustrative embodiments.

The phrases "in various embodiments" and "in some embodiments" are used repeatedly. The phrases generally do not refer to the same embodiments; however, they may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Further, various operations are described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

Concentrations, amounts, and other numerical data may be presented in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of "about 1 weight percent to about 20 weight percent" should be interpreted to include not only the explicitly recited values of about 1 weight percent to about 5 weight percent, but also include individual values 2 weight percent, 3 weight percent, and 4 weight percent, and sub-ranges such as 5 weight percent to 15 weight percent, 10 weight percent to 20 weight percent, etc.

In addition, the treatment layer and treatment compositions described herein are described with particular examples from non-exhaustive lists. Any combinations of material in various amounts that perform the functions described herein, however, may be within the scope of the principles described herein, unless indicated otherwise.

A variety of print media may be used for inkjet printing, but in some instances, print media may not be universally capable of meeting the demands across printing applications. Printing applications may have vastly different demands in terms of print quality, print durability, flatness, or other performance criteria. For example, though a print medium may provide suitable results for home use, it may be possible that the same print medium may not meet the demands of commercial printing.

Described herein are various embodiments of treatment compositions comprising microfibrils and an ink-fixing agent. Also described are various embodiments of print media treated with the treatment composition and methods for forming treated print media in various embodiments, the treatment composition may further comprise one or more additives. In various embodiments, the treatment composition may enhance print quality, print durability, or flatness of printed media.

FIG. 1 is a cross-sectional diagram of an example print medium, in accordance with various embodiments. The example print medium 100 may include a substrate 102 and a treatment layer 104 on the substrate 102. The treatment layer 104 may be formed of a treatment composition including microfibrils and an ink-fixing agent. In various embodiments, the treatment layer 104 may result in the print medium 100 having an improved durability, printability (e.g., gamut, L*min, KOD, dot gain), or flatness with respect to print media without the treatment layer 104 described herein.

The substrate 102 may be selected from substrates formed from fiber based materials, plastics, transparent materials, opaque materials, papers, boards, cardstocks, fabrics, other base materials used in printing media, or a combination thereof. Some example substrates may include paper substrates, polymer substrates, photobase substrates, uncoated substrates, and coated substrates.

In one example, the substrate 102 may be made from a base material of cellulosic fibers. In another example, the substrate 102 may be made from a base material of synthetic fibers such as for example, polyamides, polyesters, polyethylene, and polyacrylic fibers. In yet another example, the substrate 102 may be made from a base material of inorganic fibers such as, for example, asbestos, ceramic, and glass fibers. In still another example, the substrate 102 may be made from a base material comprising a combination of any two or more of the foregoing cellulosic, synthetic, and inorganic fibers. The substrate 102 may be formed in any dimension, size, or thickness. Further, the substrate 102 may comprise a base material of mixture of fibers, for example, wood fibers, non-wood fibers, and recycled fibers. The substrate 102 may be printing paper such as, for example, inkjet printing paper, and may further include other forms of paper such as writing paper, laser jet paper, drawing paper, and photobase paper, as well as board materials such as paperboard, cardboard, poster board, and Bristol board.

The fibers of the base material of the substrate 102 may be produced from chemical pulp, mechanical pulp, thermal mechanical pulp, chemical mechanical pulp, or chemical thermomechanical pulp. Examples of wood pulps include, but are not limited to, kraft pulps and sulfite pulps, each of which may or may not be bleached. Examples of softwoods include, but are not limited to, pine, spruce, and hemlock. Examples of hardwoods include, but are not limited to, birch, maple, oak, poplar, and aspen.

The microfibrils may comprise fibers that are shorter, in some cases significantly shorter, than fibers that may be used for forming a substrate such as, for example, the substrate 102. In some examples, the microfibrils have an average length less than about 1,000 micrometers. For some of these examples, the microfibrils have an average length less than 500 micrometers. In still further examples, the microfibrils have an average length less than about 250 micrometers. In yet further examples, the microfibrils have an average length less than about 100 micrometers. In various ones of the foregoing examples, the microfibrils have an average length about 1 nanometer or more.

In various embodiments, the microfibrils have an average thickness of about 100 micrometers or less. In some of these examples, the microfibrils have an average thickness of about 20 micrometers or more. In still further embodiments, the microfibrils have an average thickness of about 60 micrometers.

The microfibrils may comprise cellulose-based fibers (such as, e.g., ARBOCEL® B600, BWW40, BE600-30PU, BE600-20, BE600-10G, or UFC100, available from J. Rettenmaier & Söhne GmbH+Co. KG, Rosenberg, Germany), synthetic-based fibers, or a combination of cellulose-based fibers and synthetic-based fibers. In some examples, the microfibrils may comprise a cellulose-based fiber selected from wood, bamboo, cotton, jute, flax, hemp, bagasse, silk, and combinations thereof. In some examples, the microfibrils may comprise a synthetic-based fiber selected from polyamides, polyvinyl alcohols, polyolefins, polyurethanes, polyesters, and combinations thereof. In still other examples, the microfibrils of the treatment layer 104 may comprise a combination of any two or more of the foregoing cellulose-based and synthetic-based fibers.

The ink-fixing agent may comprise any suitable material that bonds with one or more components in an ink. The ink-fixing agent may comprise, for example, a material that bonds with a pigment in an ink. In some examples, the ink-fixing agent comprises a monovalent, divalent or multivalent metal salt. In one example, the ink-fixing agent is calcium chloride. Examples of ink-fixing agents may include, but are not limited to, calcium chloride, sodium chloride, magnesium chloride, aluminum chloride, magnesium sulfate, aluminum chlorohydrate, calcium formate, calcium acetate, calcium nitrate, calcium acetate monohydrate, calcium propionate, calcium propionate hydrate, calcium citrate, and combinations thereof.

In various embodiments, a ratio of the ink-fixing agent to the microfibrils may be in a range of about 10:1 to about 1:100. In various embodiments, the ratio of the ink-fixing agent to the microfibrils may be in a range of about 1:1 to about 1:10.

In various embodiments, the microfibrils may be present in the treatment layer 104 in an amount from about 1 weight percent to about 99 weight percent of the treatment layer 104. In some embodiments, the microfibrils may be present in the treatment layer 104 in an amount from about 10 weight percent to 90 weight percent of the treatment layer 104. In further embodiments, the microfibrils may be present in the treatment layer 104 in an amount from about 62 weight percent to about 90 weight percent. In still further embodiments, the microfibrils may be present in the treatment layer 104 in amount from about 71 weight percent to about 90 weight percent.

In various embodiments, the treatment layer 104 may have a dry coat weight of about 0.2 $g/m^2$ to about 30 $g/m^2$. In some of these embodiments, the treatment layer 104 may have a dry coat weight of about 0.5 $g/m^2$ to about 5 $g/m^2$. In still further embodiments, the treatment layer 104 may have a dry coat weight of about 5 $g/m^2$ to about 30 $g/m^2$.

The treatment layer 104 may also include one or more additives. Examples of additives may include, but are not limited to, pigments, binders, fillers, sizing agents, slip and wet rub aids, optical brightening agents, dyes, crosslinkers, dispersants, defoamers, buffering agents, surfactants, biocides, wetting agents, antifading agents, viscosity modifiers, ultra violet absorbers, other processing aids, and combinations thereof.

Examples of binders may include, but are not limited to, starches (such as, e.g., PENFORD® Gum 280, APOLLO® cationic corn starch, ASTRO® X cationic potato starch, PENCAT® cationic corn starch, or TOPCAT® cationic starch, available from Penford Corp., Centennial, Colo., U.S.A.), latexes (such as, e.g., RAYCRYL® 1240, available from Specialty Polymers, Inc., Woodburn, Oreg., U.S.A.), polyvinyl alcohol (such as, e.g., MOWIOL® 40-88 or 4-98, available from Kuraray America, Inc., Houston, Tex., U.S.A.), and combinations thereof.

Examples of fillers may include, but are not limited to, carbonates (such as, e.g., precipitated calcium carbonate, ground calcium carbonate, and treated calcium carbonate), clays (such as, e.g., No. 1 clay, No. 2 clay, calcined day, or engineered clays), titanium dioxide, silicas (e.g., fumed silica, colloidal silica, silica gels, treated silicas), alumina, and combinations thereof. In some examples, an additive may include an inorganic pigmented clay such as, e.g., ANSILEX® 93, available from BASF Corp., Ludwigshafen, Germany.

Examples of sizing agents may include, but are not limited to, synthetic surface sizing agents (such as, e.g., BASOPLAST® PR 250 or BASOPLAST® 250, available from BASF Corp., Ludwigshafen, German), rosin sizes, alkyl ketene dimer (such as, e.g., HERCON® 195, available from Ashland Inc., Covington, Ky., U.S.A.), alkyl succinic anhydride (such as, e.g., NALSIZE® 7542, available from Nalco Co., Naperville, Ill., U.S.A.), styrene maleic anhydride (such as, e.g., SMA® 4000I resin, available from Sartomer USA, LLC, Exton, Pa., U.S.A.), styrene acrylic acid (such as, e.g., MULTISIZE® 6650, 6660, available from Hopton Technologies, Inc., Albany, Oreg., U.S.A.) styrene acrylic emulsion (such as, e.g., BASOPLAST® 400DS, available from BASF Corp., Ludwigshafen, German), polyurethane dispersions, and combinations thereof. Various combinations and/or derivatives of metal salts may also be used. Some examples of dry strengthening agents may include, but are not limited to, glyoxal, anionic, cationic or amphoteric polyacrylamides (such as, e.g., glyoxal functionalized polyacrylamide or its copolymers), while some examples of wet strengthening agents may include, but are not limited to, dialdehyde starch and polyamine-polyamide-epichlorohydrin resins (such as, e.g., polyamido-amine-epichlorohydrin, PEA).

Examples of slip and wet rub aids may include, but are not limited to, high-density polyethylene wax dispersion such as, e.g., ULTRALUBE® E846, available from Keim Additec Surface GmbH, Kirchberg, Germany, or MICHEMLUBE® 743, available from Michelman, Inc., Cincinnati, Ohio, U.S.A.), high-melting-point waxes and/or beads, such as inorganic ammonium zirconium carbonate, potassium zirconium carbonate, and organic polyamide, and methylated amino resins, and combinations thereof. Further suitable slip aids may include, but are not limited to, thermoplastic low melting point materials like a carnauba wax such as, e.g., an anionic carnauba wax emulsion or non-ionic carnauba wax emulsion, a montan wax such as, e.g., a water-based emulsion of montan-based ester wax, and a Fischer-Tropsch wax such as, e.g., a non-ionic Fischer-Tropsch wax emulsion or non-ionic Fischer-Tropsch wax dispersion. Further examples may include polyolefin based-wax such as, but not limited to, polyethylene-based wax, polyethylene-copolymer based wax, polypropylene based wax, polypropylene copolymer-based wax, an anionic polyethylene wax emulsion, an anionic polyethylene wax dispersion, a non-ionic polyethylene wax dispersion, a non-ionic polyethylene wax emulsion, or a high melt polyethylene wax dispersion. Some examples of high-density polyethylene-based wax may include, but are not limited to, a high-density polyethylene non-ionic wax emulsion, a high-density polyethylene non-ionic wax dispersion, a high-density polyethylene anionic wax dispersion, a high-density polyethylene non-ionic wax microdispersion, or a high-density polyethylene anionic wax microdispersion. Some examples of a paraffin-based wax (such as, e.g., a non-ionic paraffin wax emulsion or a solvent dispersion of paraffin wax polytetrafluoroethylene-based material (such as, e.g., a non-ionic polytetrafluoroethylene dispersion), a polyamide-based material (such as, e.g., an anionic polyamide dispersion), a polypropylene-based wax (such as, e.g., a polypropylene wax emulsion), a combination thermoplastic materials (such as, e.g., an anionic paraffin/polyethylene wax emulsion, a non-ionic high density polyethylene/paraffin wax emulsion, an anionic carnauba/polyethylene wax emulsion, an anionic co-emulsion of carnauba and paraffin waxes, an anionic carnauba/paraffin wax emulsion, a polyethylene/paraffin wax emulsion, a paraffin/polyethylene wax blend, or a high density polyethylene/polytetrafluoroethylene non-ionic wax dispersion). Examples of thermoplastic materials may include, but are not limited to, an anionic paraffin/ethylene acrylic acid wax emulsion, a cationic water based emulsion of polyolefin waxes, anionic microcrystalline wax emulsions, or a high density polyethylene/copolymer non-ionic wax emulsion.

Examples of optical brightening agents may include, but are not limited to, triazine-stilbenes, coumarins, imidazolines, diazololes, triazoles, benzoxazolines, biphenyl-stilbenes, disulfonated silbene, tetrasulfonated silbene, hexasulfonated stilbene (such as, e.g., LEUCOPHOR® SAC from Clariant Corp., Charlotte, N.C., U.S.A.) or combinations thereof.

In various embodiments, the additives may be present in an amount no greater than about 30 weight percent of the treatment layer 104. In some of these embodiments, the additives may be present in an amount no greater than about 21.5 weight percent of the treatment layer 104. In still further embodiments, the additives may be present in an amount no greater than about 10.5 weight percent.

TABLE 1 below includes specific examples of treatment compositions that may be used with the principles described herein. Data is shown in dry parts.

TABLE 1

| Composition | Arbocel® B600 | Calcium Chloride | Mowiol® 40-88 | Penford® Gum 280 | Raycryl® 1240 | Ansilex® 93 | Basoplast® PR 8152 | Hercon® 195 | Ultralube® E846 | Michemlube® 743 | Total parts |
|---|---|---|---|---|---|---|---|---|---|---|---|
| 1 | 100 | 10 | 5 | | | | | | | | 115.00 |
| 2 | 100 | 10 | 5 | | | 10 | | | | | 125.00 |
| 3 | 100 | 10 | 5 | 3.45 | | | 1.15 | | | | 119.60 |
| 4 | 100 | 10 | 5 | 3.748 | | 10 | 1.245 | | | | 129.99 |
| 5 | 100 | 5 | 5 | 3.15 | 3 | | 2.05 | | | | 118.20 |
| 6 | 100 | 15 | 5 | 3.45 | 3 | | 2.15 | | | | 128.60 |
| 7 | 100 | 15.43 | 5 | 3.75 | 3.3 | 10 | 2.33 | | | | 139.81 |
| 8 | 100 | 25 | 5 | 3.15 | 3 | 20 | 2.05 | 1 | | | 159.20 |
| 9 | 100 | 25 | 5 | 3.45 | 3 | | 2.15 | 1 | | | 139.60 |
| 10 | 100 | 25 | 5 | 3.15 | 3 | 20 | 2.05 | 1 | 1 | | 160.20 |
| 11 | 100 | 25 | 5 | 3.45 | 3 | | 2.15 | 1 | | 1 | 139.60 |

Figure 2:
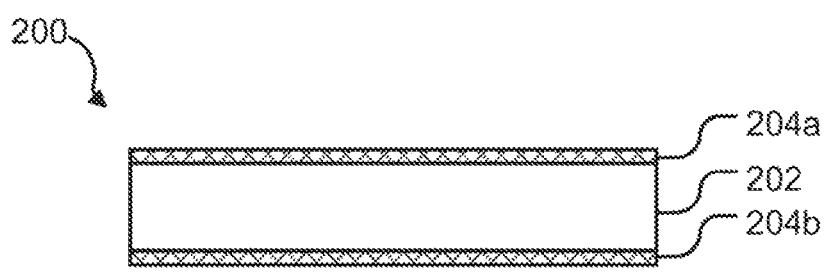
FIG. 2 is a cress-sectional diagram of another example print medium, in accordance with various embodiments.

In some examples, the treatment layer 104 may be coated onto only one side of the substrate 102, as illustrated in FIG. 1. In other examples, as illustrated in FIG. 2, a first treatment layer 204a may be coated onto one side of the substrate 202, and a second treatment layer 204b may be coated onto the other side of the substrate 202. The first treatment layer 204a and the second treatment layer 204b may be formed with the same or different dry coat weights. For example, in some examples, the first treatment layer 204a has a dry coat weight of about 0.2 g/m$^2$ to about 30 g/m$^2$ while the second treatment layer 204b has a dry coat weight of more than about 0.2 g/m$^2$ or more than about 30 g/m$^2$. In other examples, the first treatment layer 204a and the second treatment layer 204b both have dry coat weight of about 0.2 g/m$^2$ to about 30 g/m$^2$.

Figure 3:
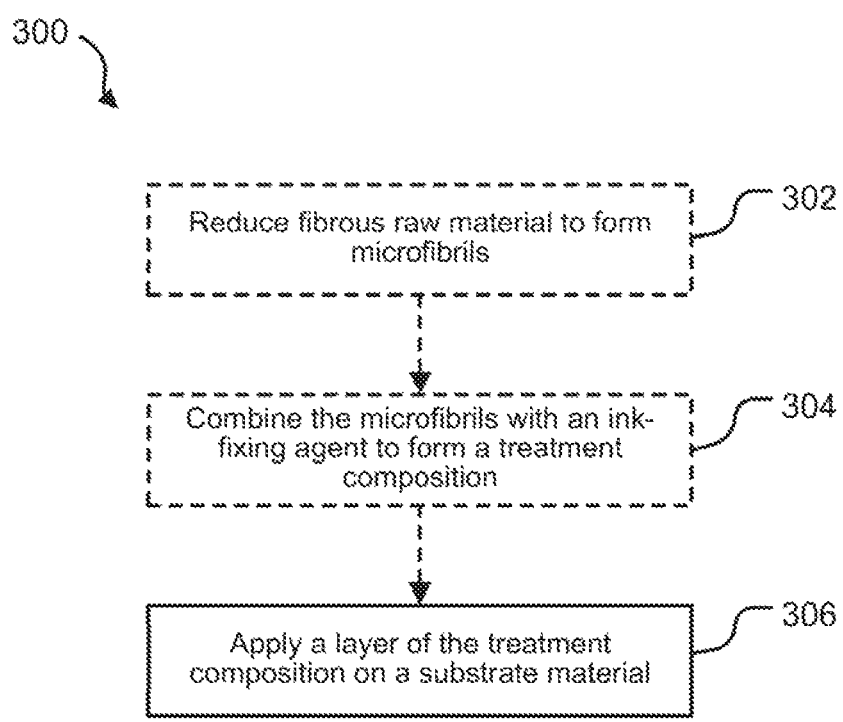
FIG. 3 is a flow chart depicting an illustrative method for forming a print medium, in accordance with various embodiments.

FIG. 3 is a flow chart depicting an illustrative method 300 for forming a print medium, in accordance with the various embodiments described herein. The method 300 may include one or more functions, operations, or actions illustrated by blocks 302, 304, and 306.

Processing for the method 300 may optionally start with block 302 by reducing a fibrous raw material to form microfibrils in accordance with various embodiments described herein. In various embodiments, the fibrous raw material may comprise any suitable raw material for making a substrate for print media. For example, the fibrous raw material may comprise cellulosic fibers, synthetic fibers, inorganic fibers, or a combination thereof. Example synthetic fibers may include, but are not limited to, polyamides, polyesters, polyethylene, and polyacrylic fibers. Example inorganic fibers such as, for example, asbestos, ceramic, and glass fibers.

The fibrous raw material may be reduced using any suitable cutting or refining operation including, for example, chemical (such as, e.g., enzymatic treatment) or mechanical (such as, e.g., refining, grinding, fluidizing). In some embodiments, the fibrous raw material may be reduced by a thermal mechanical, chemical mechanical, or chemical thermomechanical operation. In various embodiments, after the reduction operation, microfibrils of suitable size may be obtained by a fractionation operation (so that, for example, fibers having a length longer than about 1,000 micrometers may be rejected). The fractionation operation may be performed in a batch or continuous process. In various embodiments, any fibers having a length longer than 1,000 micrometers may be re-processed, rejected, or used as raw base fiber material for making a substrate. The fractionation process can be done in a batch or continue process.

The method 300 may optionally proceed to block 304 by combining the microfibrils with an ink-fixing agent, in accordance with various embodiments described herein, to form a treatment composition. As described herein, the treatment composition may comprise a ratio of the ink-fixing agent to the microfibrils in a range of about 10:1 to about 1:100. In some embodiments, block 304 may include combining one or more additives with the microfibrils and the ink-fixing agent. In these embodiments, the treatment composition may comprise up to about 30 weight percent of the additive(s).

In some embodiments, block 304 may be performed without performing block 302. In these embodiments, the microfibrils may comprise pre-made microfibrils. For example, the microfibrils may be commercially-available microfibrils.

The method 300 may proceed to block 306 by applying the treatment composition to a substrate material. In various embodiments, block 306 may comprise forming the treatment composition onto one side of the substrate or onto both sides of the substrate. As described more fully elsewhere herein, the substrate may be a substrate such as, but not limited to, a paper substrate, a polymer substrate, a photo-base substrate, an uncoated substrate, or a coated substrate. The treatment composition may be applied to the substrate by an application operation such as, but not limited to, size press, metered size press, rod coating, jet coating, blade coating, air knife coating, gravure coating, offset coating, flexo coating, roll coating, dip coating, slot die coating, curtain coating, spray coating, or a combination thereof.

In various embodiments, the treatment composition may be applied to the substrate inline on a paper-making machine, offline in which the substrate has been pre-made, during a printing operation, or a combination thereof. In some embodiments, for example, the treatment composition may be applied to the substrate during a high-speed inkjet web press printing operation. In some of these embodiments, the application of the treatment composition may be integrated into the operation prior to the printing step. In some of these embodiments, a drying operation may be performed after the application of the treatment composition on the substrate.

Though not illustrated, in various embodiments, the method 300 may include one or more additional operations such as, for example, drying, calendaring, finishing, or other operations.

EXAMPLES

The following examples are illustrative of the application of the principles of the subject disclosure. It will be noted that experimental data provided does not limit the scope of the embodiments. Rather, such data merely illustrate the preparation of composition embodiments in accordance with the subject disclosure as well as for demonstrating the properties described above illustrating the usefulness of the treatment compositions.

Venous ones of the compositions described in TABLE 1 were prepared. The compositions were mixed together in a beaker using standard benchtop mixing equipment.

The compositions were applied on three different substrates using a Mayer rod and pilot coater slot die system. The substrates included thin raw base paper (51 $g/m^2$), thick raw base paper (170 $g/m^2$), and coated paper (163 $g/m^2$). After coating/drawdowns, the sheets were dried and lab calendared at 2500 psi, 120° F., and 2 passes.

Example samples are described in TABLE 2. As shown three untreated controls are included. Control 1 is UTOPIA® inkjet matte coated paper (67 $g/m^2$), available from Appleton Coated LLC, Combined Locks, Wis., U.S.A. Control 2 is UTOPIA® inkjet dull coated paper (120 $g/m^2$), available from Appleton Coated LLC, Combined Locks, Wis., U.S.A. Control 3 is SAPPI® JAZ™ Silk paper (115 $g/m^2$), available from Sappi Fine Paper Europe, Brussels, Belgium.

TABLE 2

| Sample # | Treatment layer composition | Substrate | Treatment coat weight ($g/m^2$) |
| --- | --- | --- | --- |
| Control 1 | N/A | UTOPIA ® inkjet matte coated paper (67 $g/m^2$) | N/A |
| Sample 1 | 8 | Thin raw base substrate (51 $g/m^2$) | 4.6 |
| Sample 2 | 9 | Thin raw base substrate (51 $g/m^2$) | 4.9 |
| Control 2 | N/A | UTOPIA ® Inkjet dull coated paper (120 $g/m^2$) | N/A |
| Sample 3 | 8 | Thick raw base substrate (170 $g/m^2$) | 4.7 |
| Sample 4 | 9 | Thick raw base substrate (170 $g/m^2$) | 4.9 |
| Control 3 | N/A | SAPPI ® JAZ ™ Silk paper (115 $g/m^2$) | N/A |
| Sample 5 | 7 | Coated paper substrate (163 $g/m^2$) | 5.0 |
| Sample 6 | 8 | Coated paper substrate (163 $g/m^2$) | 5.0 |
| Sample 7 | 9 | Coated paper substrate (163 $g/m^2$) | 4.8 |

TABLE 3 describes the ink-fixing agent to microfibrils ratios, fibril weight percentages, and additives weight percentages for the samples.

TABLE 3

| Sample # | Ink-fixing agent to microfibrils ratio | Weight percentage microfibrils | Weight percentage of additives |
|---|---|---|---|
| Sample 1 | 1:4 | 62.8% | 21.5% |
| Sample 2 | 1:4 | 71.6% | 10.5% |
| Sample 3 | 1:4 | 62.8% | 21.5% |
| Sample 4 | 1:4 | 71.6% | 10.5% |
| Sample 5 | 1:6.5 | 71.5% | 17.4% |
| Sample 6 | 1:4 | 62.8% | 21.5% |
| Sample 7 | 1:4 | 71.6% | 10.5% |

Prints were then made using inkjet ink on the samples and controls. The samples in TABLE 2 were printed using an HP CM8060 MFP printer using HP A50 CMYK pigment inks.

Figure 4:
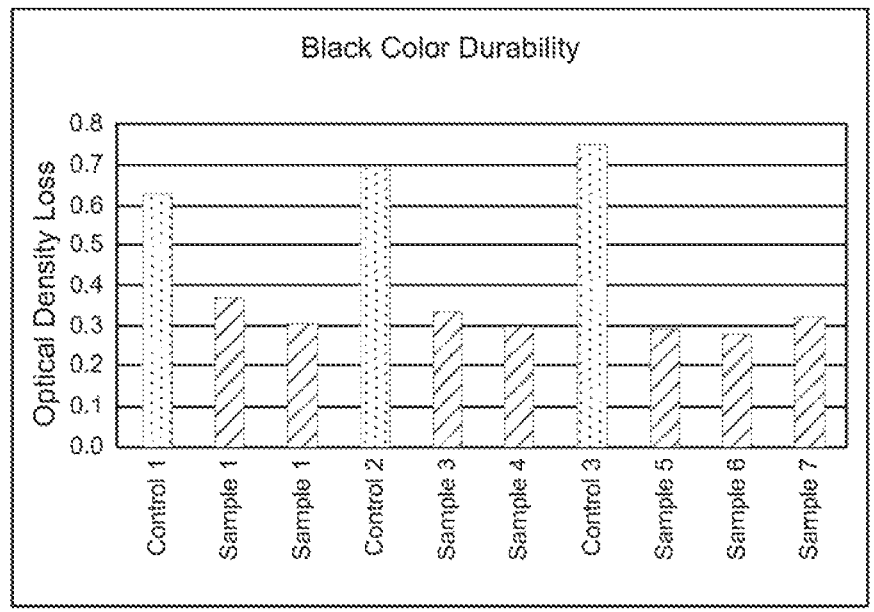
FIG. 4 is a graph depicting the black color durability values of various examples of print media, in accordance with various embodiments.
Figure 5:
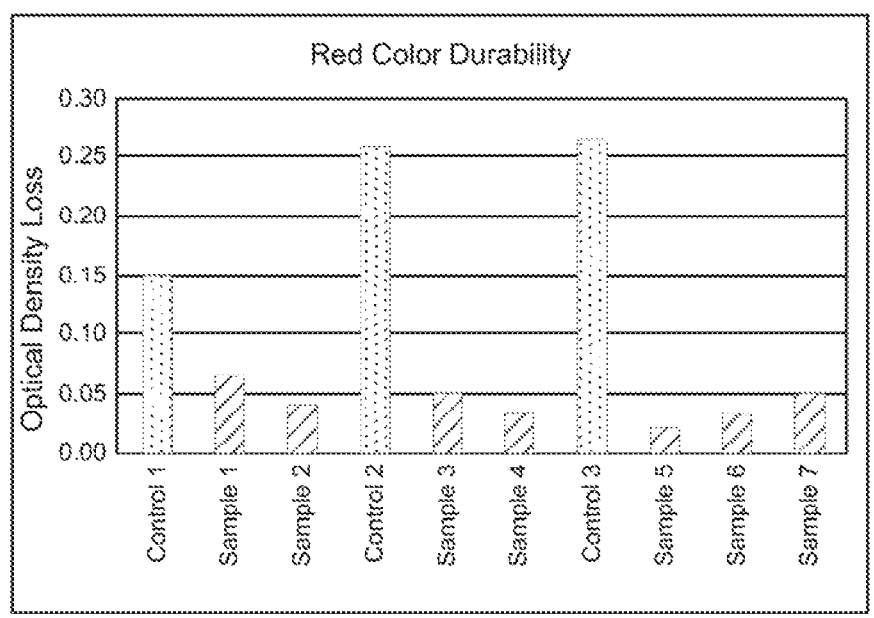
FIG. 5 is a graph depicting the red color durability values of various examples of print media, in accordance with various embodiments.

After printing, the samples and controls were tested for durability. Durability of the printed samples was tested by analyzing ink rub-off using an eraser tool (PAPER MATE® PINK PEARL® eraser with standard calibrated pressure). The optical densities (OD) of damaged and undamaged areas of black and red ink colors were measured and optical density loss (i.e., undamaged area OD−damaged area OD) was calculated. The absolute OD loss and percent OD loss measurements are shown in TABLE 4, with the black color durability data plotted in FIG. 4 and the red color durability data plotted in FIG. 5. As can be seen, the samples exhibited significantly better durability for both black and red ink colors as compared to the controls.

TABLE 4

| Sample # | Black OD Loss | Black % OD Loss | Red OD Loss | Red % OD Loss |
|---|---|---|---|---|
| Control 1 | 0.63 | 47% | 0.15 | 27% |
| Sample 1 | 0.37 | 25% | 0.07 | 12% |
| Sample 2 | 0.31 | 21% | 0.04 | 7% |
| Control 2 | 0.70 | 51% | 0.26 | 47% |
| Sample 3 | 0.33 | 23% | 0.05 | 10% |
| Sample 4 | 0.30 | 20% | 0.03 | 6% |
| Control 3 | 0.75 | 52% | 0.27 | 47% |
| Sample 5 | 0.29 | 20% | 0.02 | 5% |
| Sample 6 | 0.28 | 19% | 0.03 | 6% |
| Sample 7 | 0.32 | 22% | 0.05 | 9% |

Figure 6:
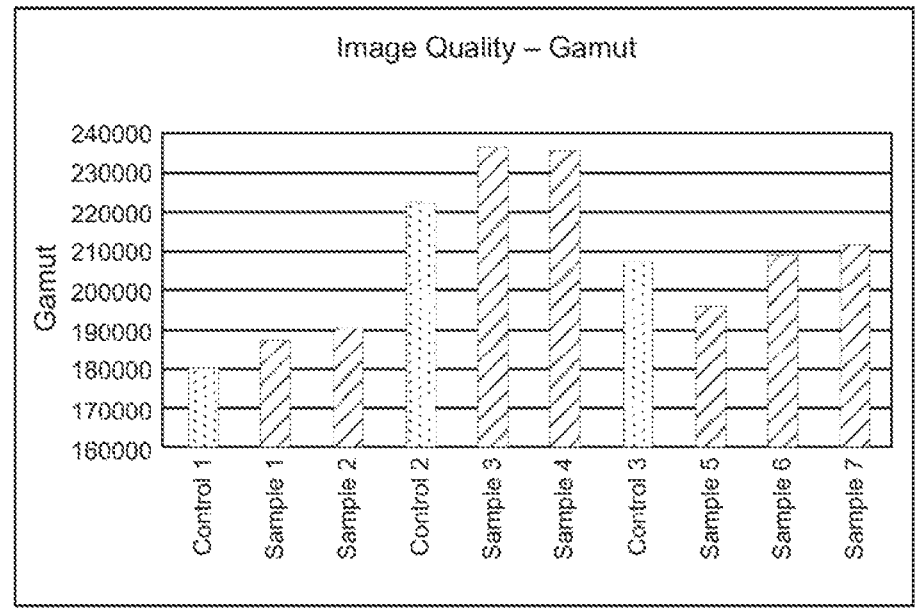
FIG. 6 is a graph depicting the gamut values of various examples of print media, in accordance with various embodiments.
Figure 7:
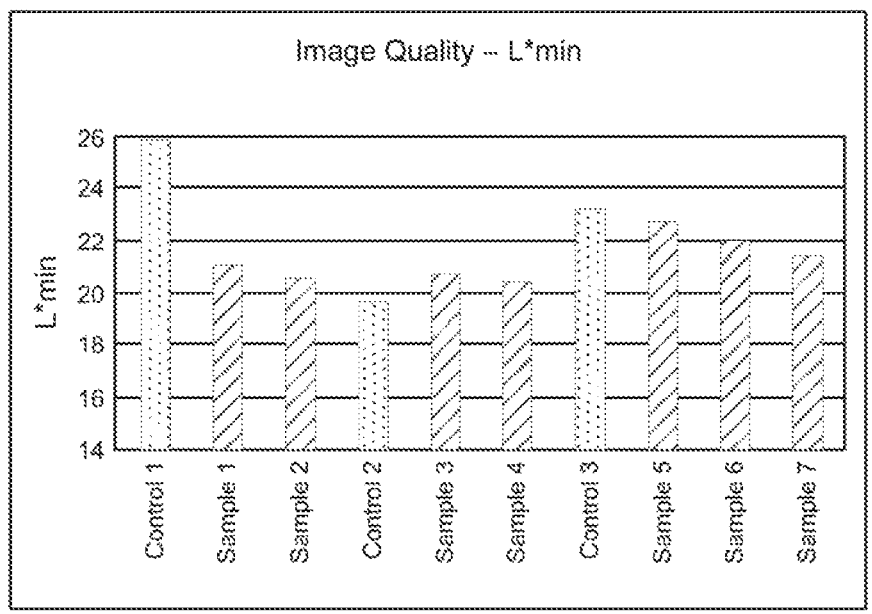
FIG. 7 is a graph depicting the L*min values of various examples of print media, in accordance with various embodiments.
Figure 8:
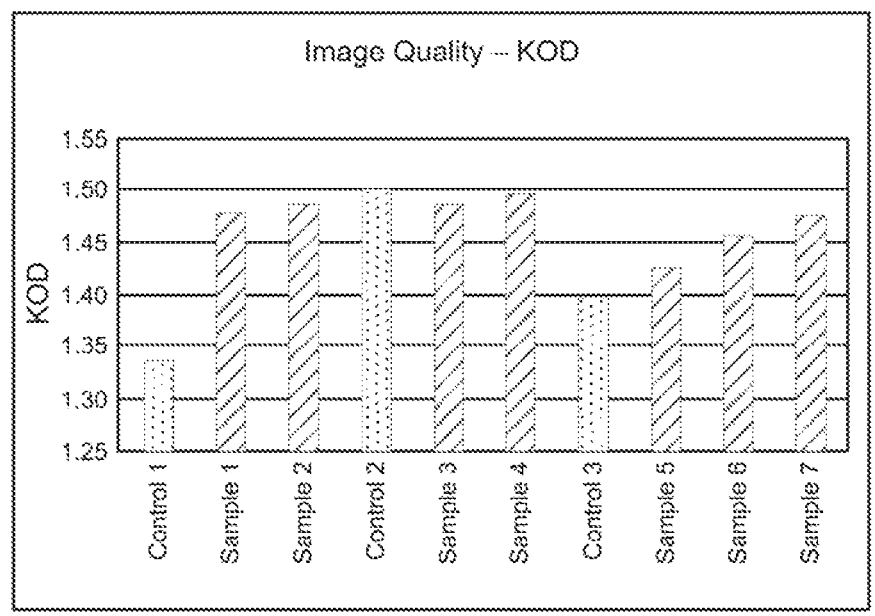
FIG. 8 is a graph depicting the KOD values of various examples of print media, in accordance with various embodiments.

The samples and controls were also tested for image quality. Specifically, the samples and controls were tested for gamut, L*min, and black optical density (KOD) using an X-RITE® 933 Densitometer (available from X-Rite, Inc., Grandville, Mich., U.S.A.). KOD was measured using Den A settings. Gamut was calculated from eight colors (cyan, magenta, yellow, black, red, green, blue, and white). L*a*b values were measured using D65/2° settings. Color gamut, L*min, and KOD measurements are shown in TABLE 5, with the gamut data plotted in FIG. 6, the L*min data plotted in FIG. 7, and the KOD data plotted in FIG. 8. As can be seen, most of the samples exhibited equal or better image quality as compared to the controls.

TABLE 5

| Sample # | Gamut | L*min | KOD |
|---|---|---|---|
| Control 1 | 180165 | 25.84 | 1.337 |
| Sample 1 | 187057 | 21.08 | 1.480 |
| Sample 2 | 190512 | 20.57 | 1.489 |
| Control 2 | 222098 | 19.65 | 1.503 |
| Sample 3 | 236485 | 20.76 | 1.488 |
| Sample 4 | 235447 | 20.45 | 1.498 |
| Control 3 | 207269 | 23.34 | 1.398 |
| Sample 5 | 196011 | 22.74 | 1.427 |
| Sample 6 | 209128 | 22.01 | 1.457 |
| Sample 7 | 211542 | 21.41 | 1.477 |

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. It is manifestly intended, therefore, that embodiments be limited only by the claims and the equivalents thereof.

What is claimed is:

1. A print medium comprising:
    a substrate;
    a treatment layer on the substrate, the treatment layer including:
        microfibrils present in an amount from about 62 weight percent to about 90 weight percent of the treatment layer; and
        an ink-fixing agent selected from the group consisting of sodium chloride, calcium chloride, magnesium chloride, aluminum chloride, magnesium sulfate, calcium nitrate, and combinations thereof, wherein a weight ratio of the ink-fixing agent to the microfibrils is in a range of about 1:1 to 1:4.

2. The print medium of claim 1, wherein the treatment layer has a dry coat weight of about 0.2 g/m$^2$ to about 30 g/m$^2$.

3. The print medium of claim 1, wherein an average length of the microfibrils is in a range of about 1.0 nanometer to about 1000 micrometers.

4. The print medium of claim 1, wherein the microfibrils comprise cellulose-based fibers, synthetic-based fibers, or a combination of cellulose-based fibers and synthetic-based fibers.

5. The print medium of claim 4, wherein the cellulose-based fibers are selected from wood, bamboo, cotton, jute, flax, hemp, bagasse, silk, and combinations thereof, and wherein the synthetic-based fibers are selected from polyamides, polyvinyl alcohols, polyolefins, polyurethanes, polyesters, and combinations thereof.

6. The print medium of claim 1, wherein the treatment layer includes an additive selected from binders, fillers, sizing agents, slip aids, wet rub aids, optical brightening agents, dyes, crosslinkers, dispersants, defoamers, buffering agents, surfactants, biocides, and combinations thereof, and wherein the additive is present in the treatment layer in an amount no greater than about 30 weight percent.

7. The print medium of claim 1, wherein the treatment layer is a first treatment layer on a first side of the substrate, and wherein the print medium comprises a second treatment layer on a second side, opposite the first side, of the substrate.

8. A composition for treating media, comprising:
microfibrils present in an amount from about 62 weight percent to about 90 weight percent of the composition by dry weight; and
an ink-fixing agent selected from the group consisting of sodium chloride, calcium chloride, magnesium chloride, aluminum chloride, magnesium sulfate, calcium nitrate, and combinations thereof, wherein a weight ratio of the ink-fixing agent to the microfibrils is in a range of about 1:1 to 1:4.

9. The composition of claim 8, wherein an average length of the microfibrils is less than 1000 micrometers.

10. The composition of claim 8, further comprising an additive selected from binders, fillers, sizing agents, slip aids, wet rub aids, optical brightening agents, dyes, cross-linkers, dispersants, defoamers, buffering agents, surfactants, biocides, and combinations thereof.

11. A method for forming a print medium, comprising:
applying a layer of a treatment composition on a substrate material, the treatment composition including microfibrils present in an amount from about 62 weight percent to about 90 weight percent of the composition by dry weight and an ink-fixing agent selected from the group consisting of sodium chloride, calcium chloride, magnesium chloride, aluminum chloride, magnesium sulfate, calcium nitrate, and combinations thereof, wherein a weight ratio of the ink-fixing agent to the microfibrils is in a range of about 1:1 to 1:4.

12. The method of claim 11, further comprising, prior to the applying, reducing a fibrous raw material to form the microfibrils and combining the microfibrils with the ink-fixing agent to form the treatment composition.

13. The method of claim 11, wherein the substrate is selected from paper substrates, polymer substrates, photobase substrates, uncoated substrates, and coated substrates.

14. The print medium of claim 1, wherein the microfibrils have an average thickness of about 20 micrometers to about 100 micrometers.

15. The print medium of claim 1, wherein the ink-fixing agent is calcium chloride.

* * * * *